W. E. SPARKS.
NIGHT LATCH.
APPLICATION FILED APR. 3, 1913.

1,148,549.

Patented Aug. 3, 1915.
2 SHEETS—SHEET 1.

WITNESSES:
F. A. Carlson
M. O. Williams

INVENTOR:
William E. Sparks,
BY
ATTORNEY.

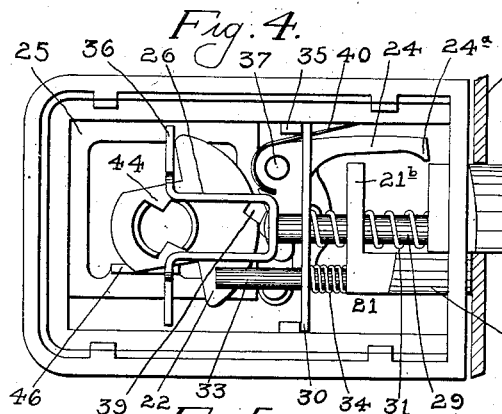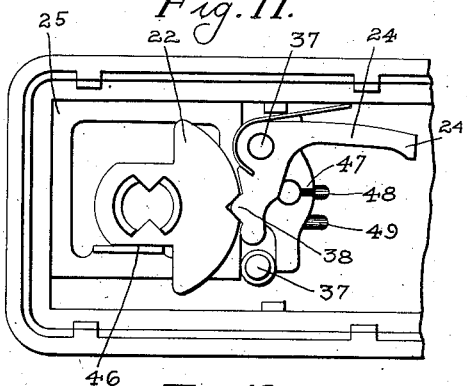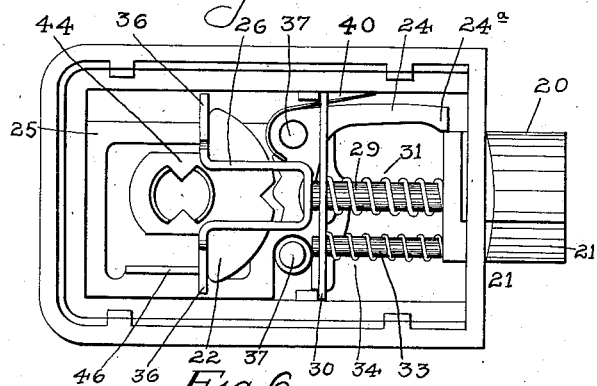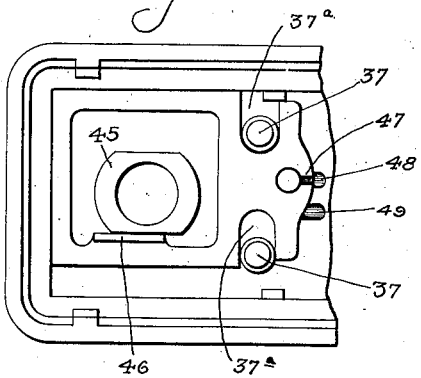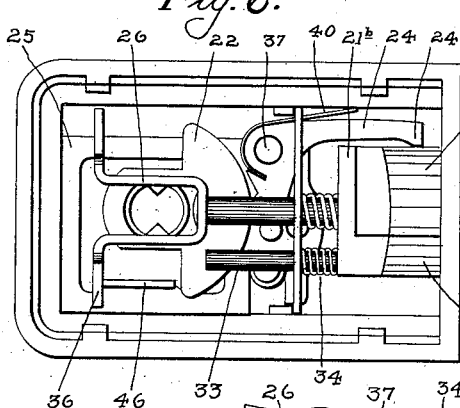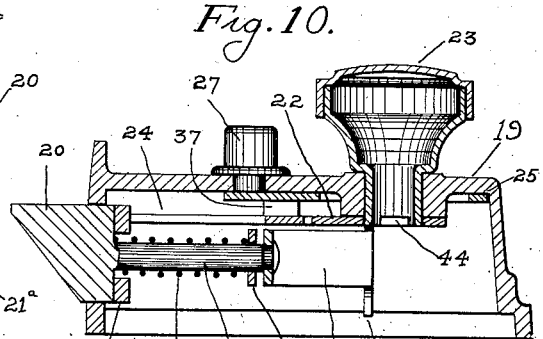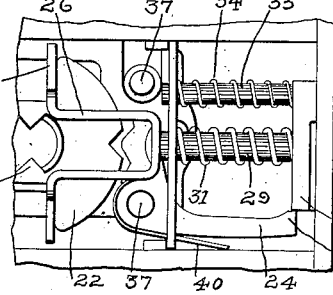

UNITED STATES PATENT OFFICE.

WILLIAM E. SPARKS, OF NEW HAVEN, CONNECTICUT, ASSIGNOR TO SARGENT & COMPANY, OF NEW HAVEN, CONNECTICUT, A CORPORATION OF CONNECTICUT.

NIGHT-LATCH.

1,148,549.　　　　Specification of Letters Patent.　　Patented Aug. 3, 1915.

Application filed April 3, 1913.　Serial No. 758,637.

*To all whom it may concern:*

Be it known that I, WILLIAM E. SPARKS, a citizen of the United States, residing in New Haven, county of New Haven, and State of Connecticut, have invented certain new and useful Improvements in Night-Latches, of which the following is a full, clear, and exact description.

This invention relates primarily to improvements in rim night latches, but certain features of the invention will be found useful in locks of widely different types.

My improvements are especially applicable to locks comprising a latch bolt which is deadlocked automatically by the closing of the door, and the invention has among its objects, the provision of improved automatic deadlocking means for the latch bolt which simplifies considerably the construction of the lock and increases the security thereof.

It is also intended to provide a lock of the type mentioned which is very readily reversible, and this result is obtained primarily by the novel relation of the controller bolt relatively to the main bolt whereby both are reversible together as a single unit.

Moreover, it is further intended to so arrange the main bolt and the controller bolt, that the controller bolt will be held in its retracted position by the main bolt when the latter is held back in the case by suitable detent mechanism.

Other objects of the invention are to provide improved manually operated deadlocking and detent mechanism for the latch bolt, and to improve various general and detail features of construction and operation in devices of the class to which my invention relates.

To these and other ends, the invention consists in the novel features and combinations of parts to be hereinafter described and claimed.

Figure 1:
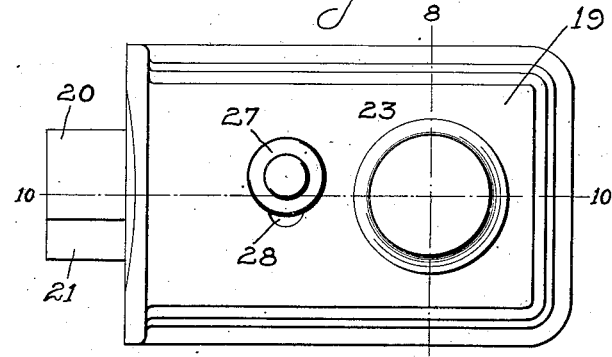
Figure 8:
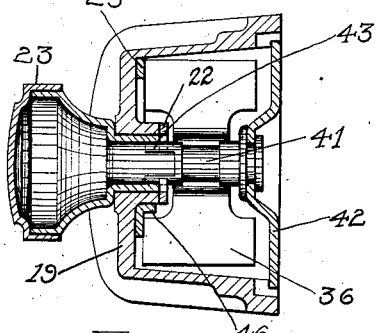
Figure 2:
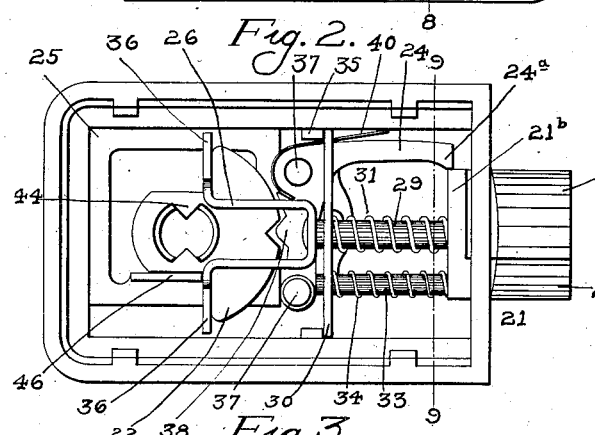
Figure 9:
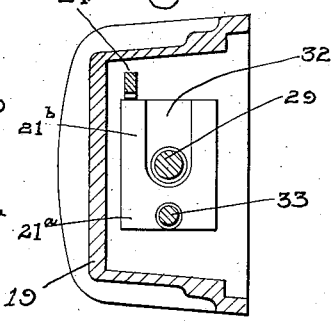
Figure 3:
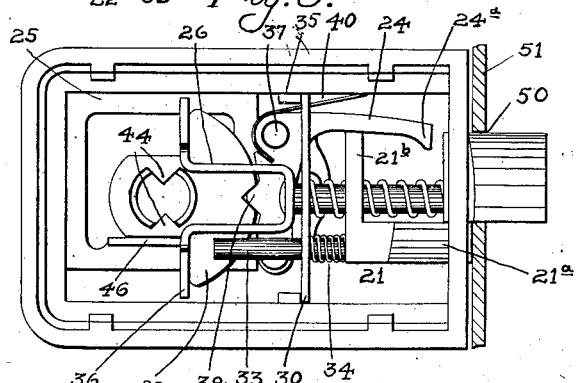
Figure 14:
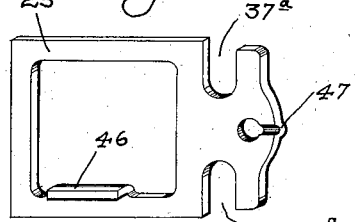
Figure 13:
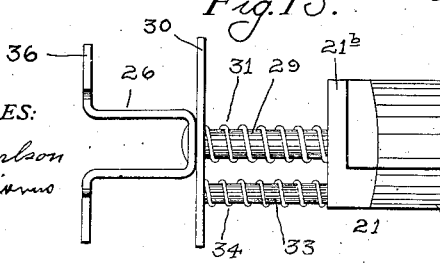
Figure 15:
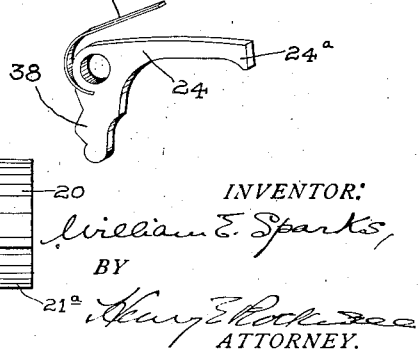

In the accompanying drawings, Figure 1 is a front elevation of a rim night latch embodying my invention, the latch bolt and the controller bolt being in the projected position, Fig. 2 is a rear view of Fig. 1 with the back plate removed, Fig. 3 is a view similar to Fig. 2 showing the positions of the parts when the door is closed, Fig. 4 is a view similar to Fig. 3 showing how the automatic deadlocking member is moved out from behind the latch bolt by the rotation of the knob, Fig. 5 is a similar view showing the latch bolt deadlocked in its projected position by the manual deadlocking means, Fig. 6 shows both bolts held in fully retracted position, Fig. 7 is a view similar to Fig. 2 but with the bolts and automatic deadlocking lever reversed, Fig. 8 is a section on line 8—8 of Fig. 1, Fig. 9 is a section on line 9—9 of Fig. 2, Fig. 10 is a section on line 10—10 of Fig. 1 with the back plate removed, Fig. 11 is a fragmentary rear view of the night latch with the bolts removed, Fig. 12 is a fragmentary view similar to Fig. 11 but with the hub and deadlocking lever omitted, Fig. 13 is a view of the unit constituted by the main and controller bolts, Fig. 14 is a detail perspective view of the deadlocking and detent slide, and Fig. 15 is a detail perspective view of the deadlocking lever.

Referring generally to the main parts of the lock, 19 denotes the case, 20 the latch bolt, 21 the controller bolt, 22 the retracting hub for the bolts and 23 a knob for operating said hub. The automatic deadlocking member for the latch bolt is shown at 24, and the manually operated means for deadlocking the latch bolt when the latter is projected, and for holding both bolts back within the case, is constituted by a slide 25 coöperating with a cross-head 26 on the tail of the latch bolt and movable into operative or inoperative position by a button 27 guided in a slot 28 in the front wall of the case adjacent the knob 23.

The detail construction of the main bolt 20 and controller bolt 21 is as follows: The bolt 20 comprises the usual head to which is attached a shank 29 passing through a central opening in a cross-piece 30. The shank or stem 29 and the cross-piece 30 are freely slidable relatively to each other and a spring 31 is interposed between the cross-piece 30 and the rear face of the bolt head. The controller bolt 21 is L-shaped and conforms to the main bolt 20 at the rear face of the latter and at one of the side faces thereof. The controller bolt is complemental to the main bolt as it lies alongside the same in the manner shown and has the same bevel; as a matter of fact, in the form shown, the bolt heads 20 and 21 may be formed by dividing a commercial latch bolt head along an L-shaped line. The horizontal portion 21ª of the controller bolt is adapted to operate in the same face plate opening in which the bolt head 20 operates. The upright portion 21$^b$ of the controller bolt which lies at the rear of the latch bolt head is cut away at 32 to provide a V-shaped part which clears the stem 29 and spring 31 of the latch bolt. The controller bolt is provided with a shank or stem 33 extending rearwardly therefrom in line with the horizontal portion 21$^a$ at one side of the latch bolt stem 29, and the stem 33 is adapted to operate in a suitable guide opening in the cross piece 30 at one side of the guide opening for the latch bolt stem. A spring 34 coiled about the stem 33 between the cross-piece 30 and the rear face of the controller bolt normally holds the upright portion 21$^b$ against the rear face of the head 20. The rear end of the latch bolt stem 29 is rigidly fixed to the cross-head 26 hereinbefore mentioned, and this cross-head holds the cross-piece 30 in place on the stem 29, forming a stop to limit the rearward movement of the cross-piece when the bolts are taken out of the case, as shown in Fig. 13. Moreover, this cross-head 26 prevents the controller bolt from being dislocated relatively to the main bolt, owing to the fact that it prevents the cross-piece 30 from passing rearwardly beyond the rear extremity of the stem 33. Inasmuch as the spring 34 holds the portion 21$^b$ of the controller bolt against the rear face of the main bolt, in which position the cross-head 26 prevents the stem 33 from falling out of the cross-piece 30, the controller bolt and the latch bolt form in connection with the cross-head and the cross-piece what is in effect a single portable unit, which may be readily handled and adjusted as such when the lock is assembled, and also when the lock is to be reversed, as hereinafter pointed out.

When the bolts 20 and 21 are assembled in the case, the cross-piece or guide member 30 is held in place against lugs or abutments 35 and the laterally extending wings 36 formed at the extremities of the U-shaped cross-head, are engaged by the hub 22. One of the corners of the upright portion 21$^b$ of the controller bolt engages and supports the extremity 24$^a$ of the lever 24, which lever is pivoted intermediate of its ends on a stud 37. The lever is made in the form of an elbow and one arm extends forward toward the latch bolt while the other arm is provided with a V-shaped nose or projection 38 adapted to engage a V-shaped recess 39 in the hub or rollback 22. A spring 40 acting on the lever 24 tends to hold the extremity 24$^a$ of said lever in the path of the latch bolt, but when the door is open, the controller bolt holds the lever 24 in an inoperative position, as shown in Fig. 2.

The hub 22 may be operated by the knob 23 or by a hub 41 mounted to rotate in the back plate 42 of the lock, as shown in Fig. 8. This hub 41 is adapted to be actuated by suitable key mechanism (not shown) operated from the side of the door opposite the knob 23, as usual in devices of this class. The hub 41 is in the form of a pillar having a forked end 43 entering the center opening of the hub 22 and coöperating with projections 44.

The combined deadlocking and detent member 25 heretofore mentioned, may take the form of a rectangular frame (Fig. 14) guided vertically on the inner surface of the front wall of the case. This frame is provided with a large center opening which clears the bearing 45 of the knob 23 and said frame is provided at its inner part with a lip 46 adapted to move vertically into and out of the path of one of the wings 36 of the latch bolt cross-head. When the frame 25 is in its uppermost position, as shown in Figs. 2 and 8, the lip 46 will clear the corresponding wing of the cross-head, but when the frame 25 is moved down into the position shown in Fig. 5, it will lie directly in the path of the cross-head wing. When the member 25 has once been adjusted by the operating button 27, it will be firmly held in the adjusted position by means such as a teat 47 adapted to engage coöperating depressions or seats 48, 49 in the wall of the case, as shown in Fig. 12.

The operation of the device is substantially as follows: The normal position of the parts when the door is open is shown in Fig. 2. The deadlocking lever 24 is held out of the path of the latch bolt by the portion 21$^b$ of the controller bolt. The springs of the respective bolts hold both of them projected out of the opening in the face plate. When the door is closed the latch bolt is moved inward and then springs out in the usual manner into a correspondingly shaped opening 50 in the strike plate 51, as shown in Fig. 3. The controller bolt, on the other hand, is pressed inward and held in its innermost position by a solid portion of the strike plate. This permits the spring 40 of the deadlocking lever 24 to move the extremity or head 24$^a$ of said lever into deadlocking position back of the latch bolt head. Thus the latch bolt will be effectively deadlocked and it will be impossible for it to be forced back into the case by an instrument inserted at the edge of the door. When the door is to be opened from the inside, the knob 23 is rotated, and before the latch bolt reaches the lever 24 (as said bolt is retracted by one of the wings of the hub 22 engaging the corresponding wing of the cross-head 26), the notched portion 39 of the hub will engage the projection 38 on the deadlocking lever and thereby shift said lever out of the path of the latch bolt, as shown in Fig. 4. As soon as the lever 24 is moved out of the way, the latch bolt is retracted in the usual manner. Substantially the same action takes place when the hub is operated from the outside of the door by means of the key mechanism (not shown) and the pillar 41, as when the hub is actuated by the inside knob.

Fig. 5 shows the positions of the parts when the latch bolt is deadlocked in its projected position by the slide button 27. This button is manipulated to move the frame 25 into such a position that the lip 46 lies immediately back of one of the wings 36 of the cross-head 26. If it is desired to hold the latch bolt in its fully retracted position, the frame 25 is moved from the position shown in Fig. 2 to the position shown in Fig. 6 while the latch bolt is held retracted, so that the lip 46 will engage the front face of the corresponding wing 36 and thereby block the outward movement of the bolt. It is important to note that in this position of the parts the controller bolt will be held retracted by the main bolt, owing to the fact that the portion 21$^b$ of the controller bolt lies back of the main bolt head.

When it is desired to give the lock the reverse bevel, the guide piece 30 is removed from its seat against the lugs 35 and both bolts are removed as a unit, after which, they are turned over and replaced in the case in the reverse position, as shown in Fig. 7. Before the bolts are put back into the case, however, the deadlocking lever must be reversed. This is effected by turning over the lever 24 and placing it on another pivot 37, which is similar to the one previously described but which is located at the opposite side of the longitudinal axis of the case. Hence it will be understood, that the lock may be reversed by placing the deadlocking lever on another pivot and by reversing the main bolt and controller bolt as a unit, it being unnecessary to detach the bolts from each other.

The pivots or posts 37 not only serve to mount the deadlocking lever in the desired adjustment, but also to guide the frame 25 rectilinearly, as shown in Fig. 12. In this view it appears that one edge of the frame 25 slides along and in contact with one wall of the case, while at the opposite end said frame is provided with notches 37$^a$ by means of which it is guided on the posts 37.

Of course, I have not attempted to illustrate and describe the numerous modifications of the construction which may be adopted within the scope of my claims.

What I claim is:

1. In a lock, a portable unit comprising a latch bolt head 20, a single latch bolt stem 29, a cross-head 26 on the rear end of the latch bolt stem, a guide piece 30 having a central opening engaging the latch bolt stem and permanently held on said stem by the cross-head 26, a spring surrounding the latch bolt stem between the guide piece and the rear face of the latch bolt head, a controller bolt, a controller bolt stem engaging an opening in said guide piece at one side of said first opening, and a spring for said controller bolt; substantially as described.

2. In a lock, a portable unit comprising a latch bolt having a single stem, a cross-head on the rear end of said stem, a guide piece permanently secured on said stem by said cross-head, a controller bolt having a stem engaging the guide piece, and springs surrounding the respective stems and interposed between the guide piece and the respective bolt heads; substantially as described.

3. In a lock, a latch bolt head 20, a stem 29 extending rearwardly from said head, a guide piece having an opening engaging said stem, a cross-head permanently holding the guide piece on said stem, a controller bolt head 21 having a part 21$^a$ extending along one side of the latch bolt head, and a U-shaped part 21$^b$ at the rear of the latch bolt head passing on opposite sides of the latch bolt stem, a stem 33 extending rearwardly from the controller bolt head and engaging an opening in the guide-piece, and springs surrounding the respective stems and interposed between the guide piece and the respective bolt heads; substantially as described.

4. In a lock, a latch bolt, a hub for retracting the same, a lever tending to deadlock said bolt, a controller bolt 21 comprising a portion 21$^a$ extending alongside of the latch bolt head, and a portion 21$^b$ at the rear of the latch bolt head, said portion 21$^b$ being adapted to engage the free end of the deadlocking lever, the latch bolt and controller bolt having parallel stems, a guide piece in which the respective stems are guided, and springs interposed between the guide piece and the respective bolt heads; substantially as described.

5. A lock having a latch bolt and controller bolt reversible as a unit, and a separately reversible deadlocking member for the latch bolt to coöperate with said controller bolt in either adjustment of the latter; substantially as described.

6. A lock having a reversible latch bolt, a reversible controller bolt, and a deadlocking lever having separate pivots on which it may be mounted to accord with the adjustment of the controller bolt; substantially as described.

7. In a lock, the combination of a case, a reversible sliding latch bolt therein, a deadlocking lever, separate posts in the case on which said lever may be mounted in accordance with the adjustment of the latch bolt, and a sliding reversible controller bolt to coöperate with said lever in either adjustment of the latter; substantially as described.

8. In a lock, a latch bolt, a hub for retracting the same having an open center with inwardly directed projections, a knob on which said hub is mounted, having a bearing in the front wall of the case, a back plate for the case, and a pillar mounted to turn in said back plate and having a forked portion projecting into the center of the hub to coöperate with said projections; substantially as described.

9. In a lock, a case, a reversible latch bolt therein, a reversible controller bolt, a deadlocking member to coöperate with said controller bolt, separate posts on the case for mounting said deadlocking member in different adjustments to accord with the adjustments of the latch bolt and controller bolt, and a manually operable blocking member for the latch bolt guided on said posts; substantially as described.

In witness whereof, I have hereunto set my hand on the 1st day of April 1913.

WILLIAM E. SPARKS.

Witnesses:
TERESA FITZSIMONS,
ZIEGLER SARGENT.